Patented Aug. 27, 1935

2,012,823

UNITED STATES PATENT OFFICE 2,012,823

PIGMENT AND METHOD OF MAKING THE SAME

Charles R. Park, Cuyahoga Falls, Ohio, assignor to The Firestone Tire & Rubber Company, Akron, Ohio, a corporation of Ohio No Drawing. Application September 17, 1932, Serial No. 633,687

7 Claims. (Cl. 106—23)

This invention relates to pigments and methods of producing the same, and more especially it relates to pigments for use in rubber compositions to color and reinforce the same.

The invention is of primary utility as a substitute for gas black when for some reason the use of the latter is undesirable, as, for instance when it is desired to produce a light-colored rubber compound. Rubber compounded with the improved pigment has tear resisting characteristics at least equal to compounds using channel gas black, and quite superior to those using ordinary blanc fixe, zinc oxide, litharge, etc. as pigments.

The chief objects of the invention are to provide a rubber composition having tear resisting characteristics at least equal to compositions employing the best carbon black, without using the latter; to provide a novel pigment capable of imparting the aforesaid characteristics to vulcanized rubber; and to provide a novel method of making a pigment of the above-mentioned character. A further object is to provide such a pigment that may be easily milled into a rubber mix. Still another object is to provide a novel composition of matter comprising vulcanized rubber, compounded with such a pigment. Other objects will be manifest.

The improved pigment comprises a mixture of ferric oxide ($Fe_2O_3$) and barium sulphate ($BaSO_4$) and is prepared by reacting solutions of ferric sulphate ($Fe_2(SO_4)_3$) and barium hydroxide ($Ba(OH)_2$). The use of barium sulphate as a rubber pigment is not new, but in its usual state is coarser grained than in the present improved pigment, and does not impart to the rubber any superior tear or abrasion resisting qualities. It is known in the trade as blanc fixe and is usually prepared by reacting sodium sulphate ($Na_2SO_4$) or sodium acid sulphate ($NaHSO_4$) and barium sulphide (BaS) or barium chloride ($BaCl_2$). Ferric oxide, made by a different method than described herein, also has been used as a rubber pigment for coloring only, but not with barium sulphate. The use of ferric oxide as a reinforcing agent heretofore has been impractical because of its high cost.

In the manufacture of the improved pigment on a small scale, a saturated solution of ferric sulphate, approximately 830 grams anhydrous ferric sulphate to 1000 c. c. of water is made up and filtered. A saturated solution of barium hydroxide is made up, filtered and decanted after standing a suitable interval. The saturated solution of barium hydroxide contains approximately 33 grams of anhydrous barium hydroxide per 1000 c. c. of water. To the ferric sulphate solution is added a determinate amount of the barium hydroxide solution which is just short of bringing the mixture to equivalency, the mixture being constantly agitated and the barium hydroxide being added as rapidly as possible. Additional portions of the barium hydroxide solution are then added until the slurry is just slightly alkaline as determined by electrometric methods or by indicators such as phenol-phthalein. At this point the reaction is completed according to the equation $$Fe_2(SO_4)_3 + 3Ba(OH)_2 = Fe_2O_3 + 3BaSO_4 + 3H_2O.$$ 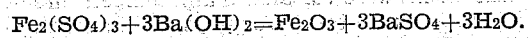

An important feature of the reaction is that all reactants are recovered as insoluble solid precipitates. Another feature of the reaction is that no other reaction product is formed and there is no necessity for washing the precipitate free from foreign materials.

The pigment thus produced is in the form of a very fine brown precipitate, the crystal grains of which have a tendency to grow rather rapidly upon standing unless a protective agent is added to coat the individual particles. To prevent the formation of large crystals, a colloidal protective agent is added to the slurry immediately after precipitation, and said colloid may consist of a soap of the alkali metals or ammonium, casein, a sulfonated oil or some other suitable agent. Ammonium stearate has been found to be a satisfactory protective colloid.

Next the slurry is diluted with water to about four times its volume with agitation, and then is allowed to settle, after which it is decanted, and filtered. If the filter cake is now dried in an oven at 100° C. in the usual way the product is hard and brittle and can be converted to usable form only with great difficulty. To avoid this difficulty the filtrate is treated, before drying, by agitating with an agent such as pine tar that induces excessive frothing the whole mixture becoming a foam of perhaps twice the original volume of the filtrate. In this form the filtrate is dried, the drying being effected more rapidly than if it were not foamed, and a finished product is produced that is soft and easily milled on the usual rubber-working mills.

As a variant of the process described, rubber latex is used as a protective agent. The latex is added to the precipitate immediately after decantation, the precipitate being recovered from the mixture by coagulating the latex. The properties of the pigment thus produced are similar to the properties of pigment produced by the first-described method.

The improved pigment is brown in color, and has a specific gravity of approximately 3.2. To illustrate further the characteristics of the improved pigment in its effect on a rubber composition, as compared to rubber mixes using carbon black and blanc fixe (BaSO4) as reinforcing agents, the following data are submitted.

Mixings were made as follows:

|  | A | B | C | D | E | F | G |
|---|---|---|---|---|---|---|---|
| Stearic acid | 3 | 3 | 4 | 4 |  |  |  |
| Sulphur | 3 | 3 | 3 | 3 | 3 | 3 | 3 |
| Zinc oxide | 5 | 5 | 5 | 5 | 5 | 5 | 5 |
| Neozone D * | 1 | 1 | 1 | 1 | 1 | 1 | 1 |
| Captax ** | .6 | .6 | 1.25 | 1.25 | 2.5 | 2.5 | 2.5 |
| Blanc fixe | 139.6 | 186.3 |  |  |  |  |  |
| Carbon black |  |  | 56.2 | 75 |  |  |  |
| Experimental pigment |  |  |  |  | 110.8 | 147.5 | 172.6 |
| Smoked sheet | 100 | 100 | 100 | 100 | 100 | 100 | 100 |

\* Phenyl beta naphthylamine.
\*\* Mercaptobenzothiazole.

The stocks contain the following pigment loadings per 100 volumes of rubber:
  A—30 volumes blanc fixe
  B—40 volumes blanc fixe
  C—30 volumes carbon black
  D—40 volumes carbon black
  E—30 volumes experimental pigment
  F—40 volumes experimental pigment
  G—47 volumes experimental pigment The stocks were vulcanized at a temperature of 260° F. and were tested for physical characteristics producing the following results:

|  | Curing time | Modulus at 400% elongation, lbs./in.² | Tensile at break pounds | Elongation percent | Resistance to tear pounds |
|---|---|---|---|---|---|
| A | 15' | 475 | 1850 | 660 |  |
|  | 30' | 1000 | 3025 | 670 | 135 |
|  | 45' | 1150 | 3300 | 660 | 200 |
|  | 60' | 1225 | 3375 | 650 | 162 |
|  | 90' | 1300 | 3100 | 620 |  |
|  | 120' | 1325 | 3075 | 610 |  |
| B | 15' | 800 | 1975 | 610 |  |
|  | 30' | 1200 | 2825 | 620 | 360 |
|  | 45' | 1425 | 3125 | 620 | 459 |
|  | 60' | 1500 | 3050 | 590 | 348 |
|  | 90' | 1400 | 2600 | 570 |  |
|  | 120' | 1450 | 2775 | 590 |  |
| C | 15' | 625 | 1500 | 610 |  |
|  | 30' | 1675 | 3575 | 620 | 514 |
|  | 45' | 2250 | 4200 | 620 | 1059 |
|  | 60' | 2775 | 4675 | 590 | 498 |
|  | 90' | 3175 | 4675 | 570 |  |
|  | 120' | 3225 | 4475 | 590 |  |
| D | 15' | 1075 | 2375 | 740 |  |
|  | 30' | 2700 | 3425 | 700 | 652 |
|  | 45' | 3100 | 3950 | 710 | 563 |
|  | 60' | 3525 | 4050 | 720 | 323 |
|  | 90' | 3825 | 4125 | 650 |  |
|  | 120' | 4025 | 4100 | 590 |  |
| E | 15' | 400 | 2250 | 760 |  |
|  | 30' | 575 | 2925 | 760 | 1550 |
|  | 45' | 675 | 3200 | 770 | 1300 |
|  | 60' | 750 | 3325 | 750 | 1260 |
|  | 90' | 800 | 3400 | 750 |  |
| F | 30' | 850 | 3050 | 730 | 1600 |
|  | 45' | 950 | 3125 | 700 | 1550 |
|  | 60' | 950 | 3175 | 710 | 1550 |
|  | 90' | 1025 | 3200 | 720 |  |
|  | 120' | 950 | 2500 | 650 |  |
| G | 30' |  |  |  | 1490 |
|  | 45' | 1150 | 3050 | 680 | 1470 |
|  | 60' | 1200 | 3200 | 690 | 1380 |
|  | 90' | 1150 | 2950 | 680 |  |
|  | 120' | 1050 | 3125 | 730 |  |

The foregoing data show that rubber compounded with carbon black has higher tensile strength but lower tear resistance than rubber compounded with the improved pigment. A peculiar feature of rubber compounded with the new pigment is that it rarely tears in a straight line but it shows extreme knottiness and a tendency to tear in a reverse direction to the direction of pull.

In addition to the ingredients hereinbefore mentioned, it has been found that excellent results are obtainable where strontium hydroxide (Sr(OH)2, barium sulphide (BaS) or strontium sulphide (SrS) are substituted for barium hydroxide, and where ferrous sulphate (FeSO4) or aluminum sulphate (Al2(SO4)3) is substituted for ferric sulphate. The foregoing ingredients are mixed to produce reactions as follows:

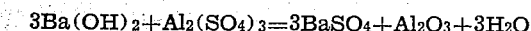
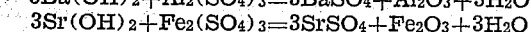
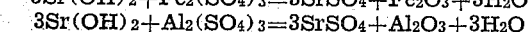
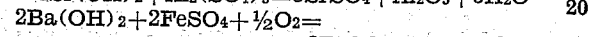
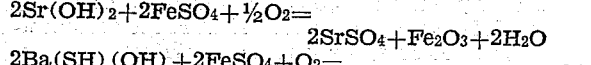
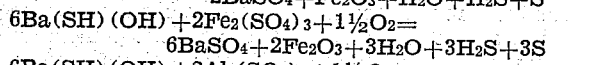

In case it is desired to change the ratio of barium sulphate (BaSO4) to ferric oxide (Fe2O3) in the finished pigment, there may be added to the mix at the time of precipitation sodium sulphate (Na2SO4), sulphuric acid (H2SO4) or acid sodium sulphate (NaHSO4). An example is as follows:

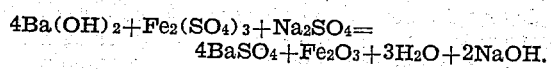

As in the case of the other reactions the Fe2O3 here apparently acts as a protective agent during precipitation, the BaSO4 probably being enclosed in a fine envelope of the hydrated oxide which inhibits grain growth. The addition of the protective colloid also assures this action.

It will be understood that frothing or foaming agents other than pine tar may be used with favorable results. Pine oil, cresylic acid, meta cresol, ortho cresol, para cresol, or mixtures of the foregoing are examples of such additional agents.

Other modifications may be resorted to without departing from the spirit of the invention or from the scope of the appended claims.

What is claimed is:

1. A pigment comprising a dried froth formed from a co-precipitated mixture of barium sulphate and ferric oxide, with a foaming agent selected from the group consisting of pine tar, pine oil, cresylic acid, metal cresol, ortho cresol and para cresol.

2. A composition of matter comprising rubber vulcanized in the presence of the reaction products of a mixture of the hydroxide of a metal from the group consisting of barium and strontium and the sulphate salt of a metal from the group consisting of iron and aluminum compounded with the rubber while in the form of a dried froth.

3. A composition of matter comprising rubber vulcanized in the presence of the reaction products of barium hydroxide and a sulphate salt of iron compounded with the rubber while in the form of a dried froth.

4. A composition of matter comprising rubber vulcanized in the presence of a co-precipitated mixture of ferric oxide and barium sulphate compounded with the rubber while in the form of a dried froth.

5. A composition of matter comprising rubber vulcanized in the presence of the reaction products of a mixture of the hydroxide of a metal from the group consisting of barium and strontium and the sulphate salt of a metal from the group consisting of iron and aluminum compounded with the rubber while in the form of a dried froth.

6. A method of preparing vulcanized rubber compound which comprises mixing the hydroxide of a metal selected from the group consisting of barium and strontium with the sulphate salt of a metal selected from the group consisting of iron and aluminum, adding a protective colloid to the mixture, filtering out the precipitate, frothing the same to form a persistent froth, drying said froth to produce a light, porous cake, incorporating said cake in a rubber batch including sulphur, and vulcanizing the resulting compound.

7. A method of preparing vulcanized rubber compound which comprises mixing a co-precipitated mixture of barium sulphate and ferric oxide, adding a protective colloid to the mixture, filtering out the precipitate, frothing the same to form a persistent froth, drying said froth to produce a light, porous cake, incorporating said cake in a rubber batch including sulphur, and vulcanizing the resulting compound.

CHARLES R. PARK.